United States Patent [19]

Lampkin

[11] 4,338,078
[45] Jul. 6, 1982

[54] HEATED CONVEYOR SYSTEM

[75] Inventor: Curtis M. Lampkin, El Paso, Tex.

[73] Assignee: Photon Power, Inc., El Paso, Tex.

[21] Appl. No.: 209,723

[22] Filed: Nov. 24, 1980

[51] Int. Cl.³ .............................................. F27D 3/00
[52] U.S. Cl. ..................................... 432/11; 198/834;
 198/849; 432/31; 432/37; 432/137; 432/209
[58] Field of Search ................. 432/11, 31, 37, 137,
 432/140, 209; 198/834, 849

[56] References Cited

U.S. PATENT DOCUMENTS

| 1,515,511 | 11/1924 | Milner | 432/137 |
| 3,223,549 | 12/1965 | Fredley et al. | 117/119.8 |
| 3,329,256 | 7/1967 | Elgaway | 198/849 |
| 3,515,854 | 6/1970 | Williams | 219/388 |
| 3,689,304 | 9/1972 | Bamford | 117/54 |
| 4,224,355 | 9/1980 | Lampkin et al. | 427/8 |

FOREIGN PATENT DOCUMENTS

| 826984 | 1/1960 | United Kingdom . |
| 954246 | 4/1964 | United Kingdom . |
| 1258802 | 12/1971 | United Kingdom . |
| 1400552 | 7/1975 | United Kingdom . |

Primary Examiner—John J. Camby
Attorney, Agent, or Firm—Carwell & Helmreich

[57] ABSTRACT

An improved conveyor assembly is provided for transporting a transparent vitreous substrate along a group of controlled radiative heaters. A plurality of control groups are formed from the radiative heaters and the illumination for the various control groups is isolated so that areas of the conveyor or substrate are illuminated by only a single control group at any one time. Heater control thermocouples are affixed to the radiative heater elements and the output signals from the control thermocouples are calibrated from a calibration thermocouple extending to a position between the control thermocouple and the substrate surface. A wire mesh belt assembly permits illumination of the substrate through the conveyor assembly while supporting the substrate in a manner effective to obtain uniform heating of the substrate. A chain-type system is used for moving the supports of the wire mesh belt and end drum portions of the conveyor are configured to accommodate any difference in radius of travel between the mesh belt and the support bars as the assembly rotates about the end drums.

26 Claims, 7 Drawing Figures

HEATED CONVEYOR SYSTEM

FIELD OF INVENTION

This invention relates to methods and apparatus for forming high quality thin films and, more particularly, to method and apparatus for continuously moving a substrate through a plurality of heat zones controlled to establish a suitable substrate temperature.

BACKGROUND OF THE INVENTION

The ability to form high quality thin films from a spray deposition process is being sought for volume production of such films useful in solar energy conversion devices and in transparent electrically conductive vitreous substrates, among many other applications. In these applications a high quality film generally means a film having only that thickness required to obtain the desired electrical or photovoltaic effect, the film properties being substantially uniform over the entire surface area of the filmed substrate.

Transparent vitreous substrates, such as glass, may be coated with electrically conductive films for use in a variety of applications. The electrically conductive film can be used as a resistor-type element in order to produce a heated surface when electrical current is passed through the film for use in maintaining an ice-free surface, such as an aircraft windshield. Yet another use for a transparent substrate having a continuous coating of electrically conductive material is to provide a surface which is highly reflective for infrared radiation. Such a surface could then be a heat control device, keeping incident infrared radiation from entering an enclosed space or keeping radiated infrared waves from leaving an enclosed space.

In yet another application, transparent electrically conductive films may be formed in a conductive pattern on a transparent substrate for use in electronic display devices. Electronic display devices, such as liquid crystal devices, require that an electrical field be produced over a medium which has visibility characteristics which are alterable by an electrical field. Such devices, however, require that the resulting display be viewable through at least one of the electrically conductive patterns, thus necessitating a transparent electrically conductive pattern. High quality films are required to maintain a high degree of pattern resolution, optical clarity, and freedom from annoying interference patterns.

A further use for high quality thin films is in a photovoltaic cell, and more particularly, a photovoltaic cell forming a cadmium sulfide (CdS)-type material over a transparent electrically conductive substrate, such as tin oxide ($SnO_x$). Where the photovoltaic cells are arranged in a "backwall" configuration on a transparent vitreous substrate, incident irradiation must pass through the $SnO_x$ and CdS layers in order to reach the heterojunction where the photovoltaic conversion occurs. Thus, minimum thickness films with a high degree of light transmission are required in order to maximize the light which reaches the heterojunction. A high degree of film uniformity is also required in these applications in order to prevent pinhole defects where an overlaying layer may penetrate an underlying layer to produce various deleterious effects.

A major contributor to producing high quality films from a spray deposition process is the capability of uniformly heating the transparent vitreous substrate throughout the film-forming operation to minimize temperature gradients over the substrate surface wherein uniform film-forming characteristics may be maintained. U.S. Pat. No. 4,224,355, issued to Lampkin et al. on Sept. 23, 1980, which disclosure is incorporated herein by reference, discusses method and apparatus in the prior art for use in heating substrates during film-forming operations. The subject U.S. patent further teaches improved techniques for heating a substrate where radiant heaters are selectively energized to produce a radiant energy input distribution adjacent the substrate approximating the heat loss energy distribution during the film-forming process. The method and apparatus described therein produce high quality films of $SnO_x$ and CdS having uniform qualities not theretofore available from spray deposition processes.

However, the method and apparatus taught by U.S. Pat. No. 4,224,355 obtained some operational problems. The apparatus for conveying a transparent vitreous substrate provided a screw conveyor and a series of trolleys, each trolley supporting a substrate for movement through the system. Such trolleys are subject to mechanical problems and intermittent jamming of the conveying system occurred. Further, considerable handling of the substrate was required with the trolley system. In addition, the trolley system introduced a considerable mass of a metallic material about the periphery of the glass which affected the system capability to maintain uniform substrate temperatures.

Further, the temperature control system discussed therein provided thermocouples generally attempting to sense the temperature of the substrate surface. Although operational control could be obtained from the thermocouples, calibration of the system was difficult and changing system conditions from age, spray accumulation and the like made accurate temperature control maintenance difficult.

The disadvantages of the prior art are overcome by the present invention, however, and improved methods and apparatus are provided for continuously conveying and heating a substrate while spray depositing materials forming thin films on the substrate.

SUMMARY OF INVENTION

An improved conveyor assembly is provided for transporting a transparent vitreous substrate along a group of controlled radiative heaters. A plurality of control groups are formed from the radiative heaters and the illumination for the various control groups is isolated so that areas of the conveyor or substrate are illuminated by only a single control group at any one time. The control group isolation permits effective control of the heaters to obtain a thermal input profile effective to maintain the substrate temperature at preselected temperature ranges as a function of substrate location within the heated conveyor.

In a preferred embodiment of the heated conveyor system, heater control thermocouples are fixed to the radiative heater elements and the output signals from the control thermocouples are calibrated from a calibration thermocouple extending to a position between the control thermocouple and the substrate surface. A wire mesh belt assembly permits illumination of the substrate through the conveyor assembly while supporting the substrate in a manner effective to obtain uniform heating of the substrate. Close control of the gaps between the substrate edges and facing portions of the mesh support system is maintained. Maintenance of the tolerances is obtained by using a chain-type system for moving the wire mesh supports and configuring the end drum assemblies to accommodate the difference in radius of travel for the mesh and the supports about the end drums.

A process for heating a transparent vitreous substrate on a continuous conveyor is provided by illuminating a given point on the substrate surface from only a single controlled heater group at any one time. Isolation of thermal inputs is obtained for effective control. In a preferred embodiment, the substrate is conveyed while being supported substantially only along leading and trailing edge portions, wherein a substrate surface may be illuminated through the conveyor. Control of the power input to the radiative heater control groups is obtained by monitoring the temperature of at least one radiative heater within each control group and comparing the temperature signal with a temperature set point signal. The temperature set point signal may conveniently be obtained using a calibration thermocouple for use in adjusting the heater power inputs until the outputs from the control thermocouple and the calibration thermocouple satisfy a preselected relationship indicating the substrate surface temperature is within a selected range.

It is a feature of the present invention to provide a continuous conveyor system having a plurality of controlled heater inputs for minimizing temperature gradients in the substrate transverse to the direction of substrate movement while providing thermal gradients along the direction of substrate travel to maintain the substrate temperature within preselected limits.

It is another feature of the present invention to permit radiant heating of the substrate from beneath the conveyor assembly.

It is yet another feature of the present invention to maintain the gaps between the edges of the substrate and facing portions of the conveyor support system within preselected tolerances during the conveying cycle.

One other feature of the present invention is to provide a continuous mesh belt assembly for supporting the substrate only along leading and trailing edge portions.

A feature of the present invention is to adhere the control thermocouple to a radiant heater.

Another feature of the present invention is to provide a calibration thermocouple at a location between the control thermocouple and the substrate surface and a predetermined relationship between outputs from the control thermocouple and the calibration thermocouple with the substrate temperature wherein a control set point can be obtained for the control thermocouple output.

DETAILED DESCRIPTION

Figure 1:
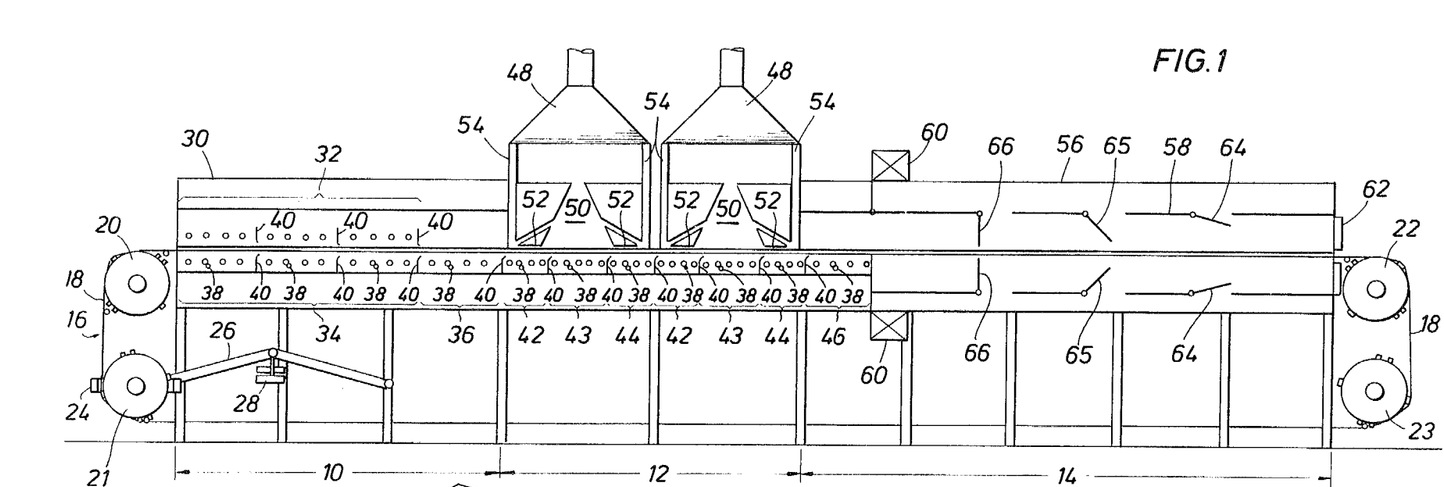
FIG. 1 is a schematic cross section of a heated conveyor system according to the present invention.

Referring first to FIG. 1, there is depicted in schematic cross section a heated conveyor system suitable for forming high quality thin films in a spray deposition process. A typical heated conveyor section may contain a preheat zone 10 for establishing a substrate at a first selected temperature, a heated spray deposition zone 12 for maintaining the substrate temperature within a range of temperatures suitable for film formation, and a post heat section 14 for maintaining the substrate temperature to complete film formation and for cooling the hot substrate. Many configurations and combinations of the heat zones may be utilized in forming the various thin films of interest. For example, the substrate may be conveyed from one spray section to another spray section without the need for cooling the substrate to ambient conditions. In yet another example, a preheat and postheat section may be combined for the purpose of altering the characteristics of the spray deposited material.

A continuous conveyor system 16 is conveniently provided for supporting and aligning substrate materials for movement through the various heat zones. Conveyor belt 18 is initially supported and aligned by top belt drums 20 and 22 located at entrance and exit regions, respectively, of the selected combination of heat zones. Belt tensioning drum 21 is slidably supported beneath drum 20 for tensioning conveyor belt 18. Tensioning may be provided by a simple lever system 26 where weights 28 are adjusted to maintain the desired tension in belt 18 for supporting the substrates. It is apparent that a variety of hydraulic and mechanical systems might be employed to tension belt 18, although the simple mechanical arrangement using lever arms 26 and weights 28 is presently used. Roll 21 is slidably and rotatably mounted on support 24 for tension adjustment.

Belt 18 takeoff drum 23 may conveniently be provided beneath drum 22 for supporting and aligning belt 18 for return to tensioning drum 21. A suitable drive mechanism (not shown) may be connected to one of the drums for moving belt 18 in a continuous manner.

In functional terms, conveyor system 16 is selected to support a transparent vitreous substrate, such as glass, in a manner which permits uniform radiative heating of the substrate and without affecting the temperature of the substrate itself. Conveyor system 16 must also accommodate a variety of thermal expansion and contraction conditions as the belt traverses the various heat zones and must provide for maintaining substrate alignment and spacing conditions during the traverse. It is also desirable for belt 18 to retain the substrate material if breakage occurs during the film formation process.

Referring now to preheat zone 10, an insulated furnace is provided with removable top 30 and opposed heater sections 32 and 34. Heater sections 32 and 34 provide a muffle furnace for rapidly heating an entering vitreous substrate. A vitreous material, such as glass, is capable of withstanding a very large temperature gradient in one dimension, but will break readily if a second orthogonal temperature gradient is introduced. Thus, heater sections 32 and 34 produce the requisite temperature uniformity across the substrate wherein a high rate of temperature increase can be obtained along the direction of substrate movement. Once the desired substrate temperature has been reached, a prespray heat zone 36 is provided for adjusting the substrate temperature just prior to a substrate entering the spray zones.

Figure 2:
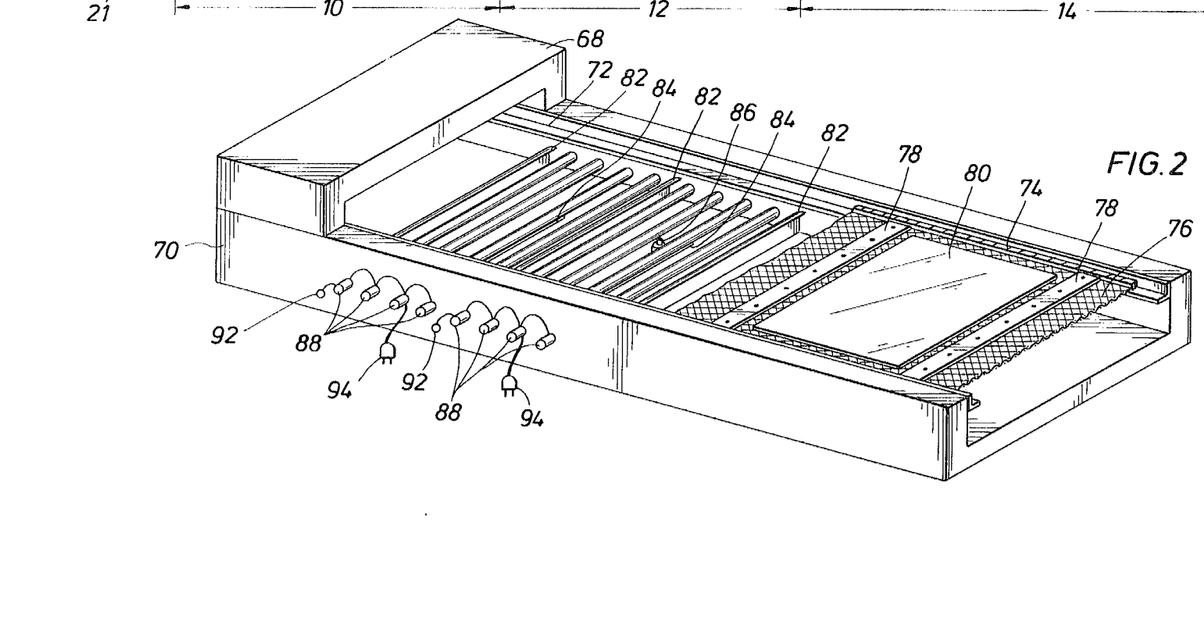
FIG. 2 is an isometric view in partial cut-away, illustrating component features of a heated conveyor system.

Spray control zone 12 is provided for controlling the radiant heat input during spray deposition and film formation. This section requires the greatest amount of power input and the closest control of energy input gradients to approximate the energy losses imposed by the spray and required for film formation.

For description purposes, two spray booths 48 are illustrated. A suitable spray booth may include spray area 50 providing a minimum volume for accepting the desired spray configuration, a film formation zone, such as beneath roof area 52, and exhaust system 54 for removing reaction products and undeposited sprayed materials. Suitable spray booth designs are disclosed in a patent application Ser. No. 209,724 entitled "Improved Spray Methods and Apparatus", filed concurrently herewith, which disclosure is incorporated herein by reference.

Thus, a plurality of heater control zones are provided beneath spray booth 48 for approximating the thermal loss profiles. In one embodiment, there is provided a first entrance control zone 42, a spray zone control group 43, and an exit control group 44. Each of the control groups is separately energized in response to the heat removal load imposed on the portion of the substrate above the particular control group.

Temperature control is attained by measuring the temperature of a selected heater element by thermocouples 38. Thermocouples 38 are firmly affixed to their respective heater elements, preferably by welding. As hereinafter explained, a correlation may be established between the temperature of the heater element and the temperature of the substrate above a controlled heater group. The control function is obtained by a computer implemented duty cycle control system.

Control group isolation shields 40 are provided to ensure that a controlled group of heaters illuminates substantially only that portion of the substrate above the controlled heater group. If "cross-talk" were permitted between adjacent heater groups, it may be appreciated that a control thermocouple might be responding to substrate temperatures which are the result of heating by an adjacent control group. Control group isolation shields 40 prevent such "cross-talk" and permit a substrate surface area to be illuminated by one controlled heater group at a time. In addition to providing isolation for the heater control groups, the shields 40 also act to impede the flow of air through the heater region of the control zones. This impediment substantially eliminates exhaust induced and convection air currents which might act to carry spray materials beneath the substrate and which can create temperature maldistributions along the substrate.

Referring now to cooldown section 14, there is depicted a line section for returning the heated substrate to substantially ambient temperature. A heated section 46 is provided adjacent spray zone 12 for heating the substrate to complete the film-forming reaction and to maintain the substrate heated until the trailing edge is removed from the spray zone 12. Cool-down section 14 then provides for gradually cooling the substrate.

Cooling exhaust ducts 60 are connected to an exhaust fan (not shown) which create airflow internal to cool-down section 14 and beneath insulated roof portion 56. This air flow enters through air filter 62 into cooling box 58. At the exit portion of the cool-down section 14, substantially all of the air flow is within cool down box 58 as the substrate nears ambient temperature.

Portions of the incoming airflow may be progressively diverted from the inside of cooling box 58 to the outside of cooling box 58. Alternatively, a single set of baffles 65 or 66 may be actuated and set near the surface of a substrate to induce airflow from above the surface to the area above cooling box 58. This diversion provides a stepped change in the substrate cooling mechanism from convective and conductive cooling at the substrate exit from cool-down section 14 to radiative cooling at the entrance to cool-down section 14. Thus, baffle pairs 64 and 65 divert a progressively larger portion of the airflow and baffle pair 66 thereafter diverts the remainder of the airflow to the exterior of cooling box 58.

As the substrate passes beyond postheat zone 46, heat energy is radiated from the substrate to the walls of cool down box 58 and removed from the walls by cooling air which has been diverted from the interior of cooling box 58. The heated exhaust air is removed through exhaust ducts 60. In the radiative cool-down zone, there is substantially no cooling air flow over the substrate.

As the substrate proceeds through cooling box 58 and beneath baffle pair 66, a small air flow is introduced to enhance cooling the substrate. Substantial radiative cooling continues to take place and air flow external to cooling box 58 removes heat from the heated sidewalls. Airflow over the heated substrate continues as the substrate proceeds until a substrate temperature is reached where the substrate can be removed to ambient conditions without breaking the substrate.

Referring now to FIG. 2, there may be seen an isometric illustration showing component features of oven sections are provided with an insulated bottom portion 70 and a removable insulated top portion 68. Each of these sections are preferably stainless steel shells filled with high temperature insulation wherein exterior portions may be safely contacted. Portions of top section 68 may be cut-away for placing spray booths along the conveyor section.

Heater elements 88 are generally placed along bottom section 70 at selected intervals which can provide the desired thermal energy intensity. Typically, 0.625 inch diameter heaters are provided at 1.5 inch center-to-center spacings in the spray zones. Suitable heaters may provide up to 2.25 KW of heat energy per heater. In the muffle furnace zone, heaters are also provided in the top section 68 and heater spacings may vary.

As hereinabove noted, the substrate is to be heated uniformly in a direction transverse to movement of the substrate in order to produce only one dimensional temperature gradients. Uniform lateral heating is accomplished by extending the heaters to a width greater than the width of substrate 80. Typically, the energy radiated to a given point on the substrate surface is a function of the included heater angle seen by that point on the substrate surface. The center of the substrate sees the largest included heater angle and an edge of the substrate sees the smallest included heater angle. If a 24 inch wide substrate 80 is spaced 2 inches above heater elements 88, it may be shown that an active heater length of 38 inches will produce about a 1% variation in received energy from the edge of substrate 80 to the center of substrate 80.

In order to maintain temperature uniformity of the substrate and to account for the heat capacity of the conveyor belt support and guide system, it may be desirable to include trim heaters adjacent the interior walls of insulated section 70. A trim heater includes active heating elements only adjacent the edge portions of the heater rod 88 and provides no heating elements in the central portion. Thus, additional thermal input is provided directly at areas having large heat capacities in order to improve the overall temperature distribution. Trim heaters are not necessarily required and will be a function of the overall heated conveyor system design.

As hereinabove noted, temperature control is based on the output of thermocouples 84 attached directly to heaters 88. A duty cycle control system, hereinafter described, regulates the power input to the heaters to maintain the heater temperature within selected limits. Control isolation shields 82 are provided to stabilize the relationship between the control signals to heaters 88 and the temperature of an overlying substrate. Without isolation shields 82, a substrate would receive radiative heat from a plurality of heater control groups and a correlation would have to be established between all of the control groups. Such correlation is very difficult to attain and even more difficult to maintain. With the isolation shields 82, however, a substrate surface "sees" only the radiative heat from a small control group of heaters 88.

Calibration thermocouple 86 may conveniently be provided for calibrating the duty cycle settings as a function of thermocouple 84 outputs. Calibration thermocouple 86 may be inserted from the bottom of the heated conveyor section, preferably adjacent a control thermocouple 84 wherein the thermocouple 86 is vertically located between thermocouple 84 and belt 76. Then, the temperature of an overlying substrate can be extrapolated from the temperature readings produced by thermocouples 84 and 86. For accurate set point control, an actual relationship may be experimentally determined and stored in a suitable electronic memory medium. Alternatively, a mathematical expression could be derived to approximate the experimental relationship and the appropriate constants in the equation stored for future computations. Subsequent calibration of the heater control system could then be obtained by inserting a calibration thermocouple and adjusting the duty cycle until the outputs from thermocouples 84 and 86 satisfy the stored relationships required to provide the desired substrate temperature.

Still referring to FIG. 2, a belt conveyor is provided for moving substrate 80 along the heated conveyor. Substrate 80 is typically a transparent vitreous substrate, such as glass, capable of withstanding severe one dimensional temperature gradients, but readily breakable under the influence of two dimensional temperature gradients. Hence uniform heating of substrate 80 in at least one direction is required. Further, a high quality thin film will be formed on the surface of substrate 80 opposing the radiated surface of substrate 80. A selected solution will be sprayed onto the film-forming surface and an appropriate chemical reaction will occur driven by heat input from the surface. The characteristics of the film are functionally related to the temperature of the film-forming substrate so that forming a uniform film requires a high degree of temperature uniformity on the film-forming surface.

The continuous belt conveyor system depicted in FIG. 2 includes specific features for promoting temperature uniformity. Belt 76 is preferably a wire mesh supported at appropriate points by support bars 78. Support bars 78, in turn, are supported by bottom heater section 70. In one embodiment, a continuous chain 74 is provided which rides in chain guide 72 along heater section 70. A wire mesh is selected for belt 76 which promotes uniform irradiation of the irradiated surface of substrate 80. A desirable mesh size is one which transmits the maximum incident radiation onto the substrate surface but is sufficiently tight that fragments from broken substrates are retained. A number 10 mesh size has been found suitable for this purpose. Further, it will be appreciated that belt 76 does not form a planar surface between supports 78 but, rather, sags between supports. Thus, substrate 80 is supported only along the leading and trailing edge wherein the wire mesh does not shadow the glass or introduce temperature non-uniformities. However, this sag is controlled to ensure that unacceptable deformation of the substrate does not occur during the elevated temperatures required for certain film forming operations.

The side support members and conveying mechanisms, which may be conveyor chain 74 and chain guide 72, are spaced apart from substrate 80. This minimizes the temperature perturbations along the outside edges of substrate 80 which might be affected by an adjacent metallic mass. Further, support members 78 are desirably formed to minimize the metallic mass adjacent the leading and trailing edges of substrate 80. Although not shown in FIG. 2, side shields may be used to overlay the portions of mesh 76 between the sides of substrate 80 and the sidewalls of heater section 70. Such shields minimize convection currents about the edges of substrate 80 and, in spray sections, prevent incident spray from passing into the underlying heater section.

To further promote uniform film formation, support bars 78 are formed in parallel relationship with one another and are spaced apart to minimize the gap remaining between substrate 80 and spacer bars 78. It has been found that the exhaust systems in the spray booths 48 (see FIG. 1) can induce airflow from beneath substrate 80 around the edges. The strength of this airflow is functionally related to the gap between substrate 80 and between the side shields (not shown) and spacer bars 78. The side shields (not shown) are stationary and relatively close tolerances can be maintained. However, spacer bars 78 are subject to the full range of temperature variations within the heated conveyor system and are further subject to stresses induced in passing the conveyor system over end rollers, as hereinafter described.

A chain mechanism is depicted in FIG. 2 for supporting and conveying belt 76. Chain 74, in turn, is supported by chain guide 72 during movement through the conveyor section. A variety of support and conveying systems may be designed, but the preferred chain system offers several desirable functional characteristics: only minimal lubrication is required since rotational parts are not used, parallel tracking of support bars 78 is obtained, and a chain conveniently meshes with a conventional sprocket drive system.

Figure 3:
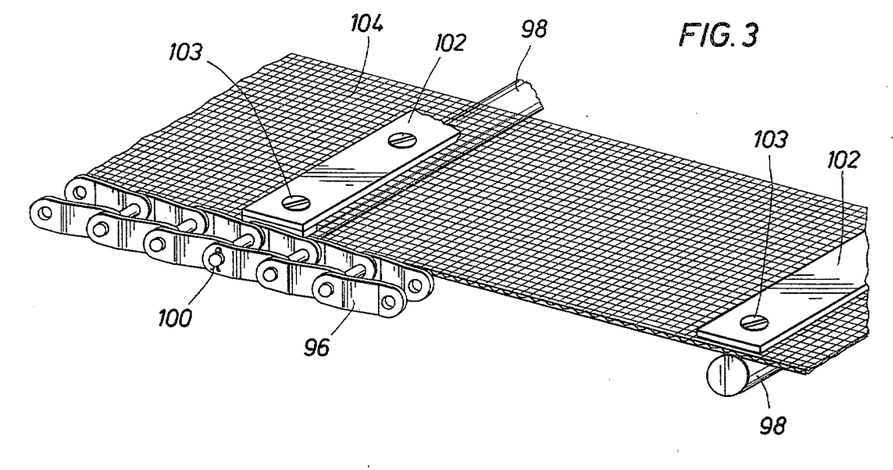
FIG. 3 is an isometric illustration of a conveyor belt construction.

Referring now to FIG. 3, there is more particularly depicted a preferred embodiment of the conveyor belt system. Wire mesh 104 is supported by support bar 98. Spacer bars 102 are provided to clamp mesh 104 to support bar 98 and are mounted thereto with fasteners 103. Spacer bar 102 is sized to accept the selected substrate dimension to preferably maintain a gap between an edge of spacer bar 102 and a facing edge of the adjacent substrate to about 0.125 inch (0.32 cm). A gap larger than the desired maximum permits sufficient airflow between the substrate and spacer bar 102 which can lift the chemical reaction from surface portions of the substrate adjacent the gap.

Support bar 98 is connected to chain 96 and may form one of the pin members interconnecting the chain links in chain 96. Chain 96 is preferably a pintle chain having links of a malleable material, such as cast iron, for high temperature operation without lubrication. Support bar 98 is removably connected with chain 96, which may be accomplished using cotter pin 100 on one side and a press fit pin on the opposite side to preclude rotation of support bar 98.

Figure 4:
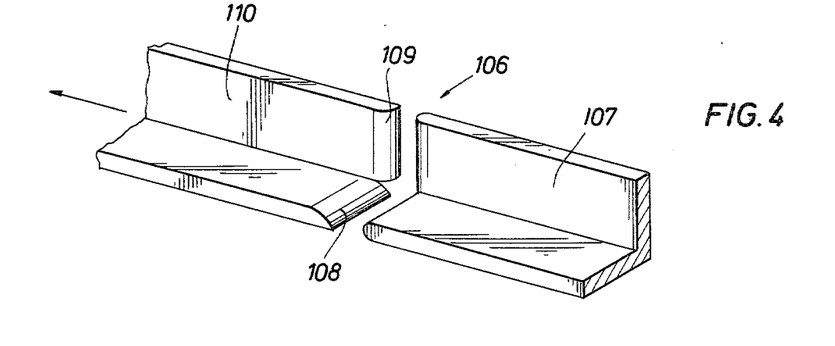
FIG. 4 is an isometric illustration of a conveyor belt guide.

Referring now to FIG. 4, chain guide assembly 106 is depicted, showing exit and entrance portions of the chain guide sections. Chain movement is generally in the direction indicated by the arrow, leaving one section at chain guide exit portion 107. Chain guide entrance portion 110 is formed to accept the chain links and promote free movement of the chain in the transition from one guide portion 107 to another guide portion 110. Thus, the walls of entrance portion 110 are separated to form a funnel shaped configuration having beveled edges 108 and 109. The chain links will thus transition smoothly from one section to another and no sharp edges are permitted which could interfere with chain movement.

Figure 5:
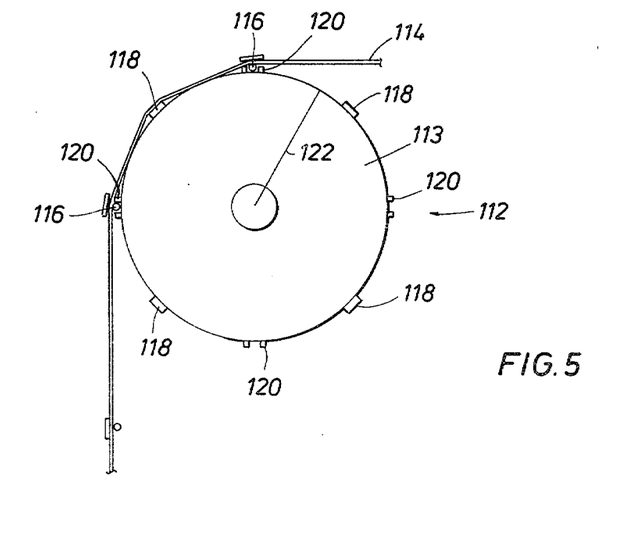
FIG. 5 is a schematic cross section of a conveyor drive drum.

Referring now to FIG. 5, there is shown a schematic cross section of a roller drum for moving conveyor belt assembly 114 in a continuous path. As hereinabove discussed, support members 116 are subject to stress-induced bowing which may be caused by movement of the conveyor system about support drum 113. As hereinabove noted, conveyor assembly 114 is supported by a chain member which engages sprocket means (not shown) located about the periphery of roller drum 113. The center of support bar 116 defines the radius 122 through which the chain rotates. It will be appreciated that belt 114 is supported on the top portion of support bar 116 and is initially at a larger radial location than the radius 122 of support bar 116. If this radial differential is not corrected, differential movement will occur between the mesh portion of belt assembly 114 and support bar 116, which is manifested in bowing of support bars 116. This bowing produces unacceptable gaps between the substrate members and the spacer bars affixed to support bars 116.

Thus, it is very desirable that the travel distance of belt 114 and the centerline of support bar 116 be equalized. As shown in FIG. 5, this is accomplished by maintaining the radius of roller drum 113 less than radius 122 of support bar 116. Support bar 116 is engaged by alignment bars 120 as the conveyor belt leaves the oven sections. Alignment bars 120 are spaced about the periphery of roller drum 113 so that each support bar 116 is accepted within a pair of alignment bars 120.

As shown in FIG. 5, belt 114 does not conform to the periphery of drum 113, but rather attempts to connect adjacent alignment bars 120 in a straight line interrupted only by intermediate contact with drum 113. Thus, the distance of belt 114 from the center of roller drum 113 will vary as the belt assembly is rotated from a radius greater than radius 122 to the radius of drum 113, which has been selected to be less than radius 122. Shims 118 may be provided to adjust the effective radius of belt 114 until the distance which belt 114 travels in passing over the conveyor rolls 113 is matched to the distance which the center line of support bar 116 travels. In this manner, differential travel is eliminated and there is no resulting stress-induced bowing of support bars 116. It is to be expected that other designs exist which equalize the distance traveled by the component members of the conveyor system in passing about support drum assembly 112, and only the preferred embodiment is hereinabove described.

Figure 6:
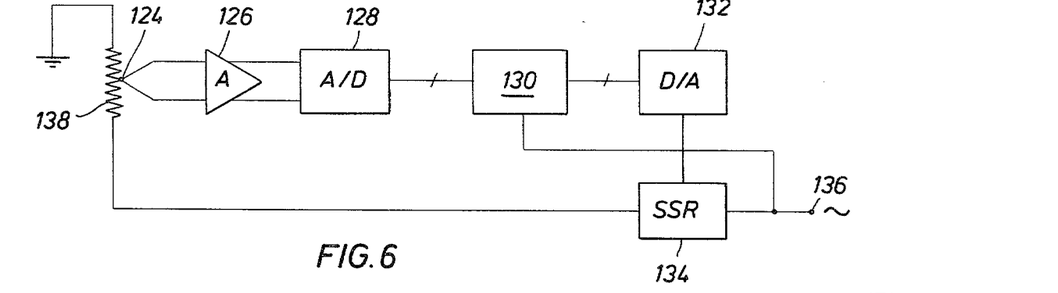
FIG. 6 is a block diagram of a temperature control system.

In FIG. 6 there is depicted, in block diagram form, a control system for energizing the heater control groups hereinabove discussed. Thermocouple 124 is firmly affixed to the surface of heater element 138 at a selected location within a control group. The output from thermocouple 124 is functionally related to the temperature of radiant heater element 138 which, in turn, is determined by the temperature of the substrate above the heater, based on fundamental radiant heat transfer theory. This output from thermocouple 124 is amplified by preamplifier 126 is converted to a digital output by analog-to-digital converter 128. The digital signal is inputted to computer 130 for use in driving a control signal, as hereinafter discussed. Another input signal to computer 130 may be line signal 136 where it is desired to perform switching functions associated with heater control at certain values of the line signal 136.

The output control signal, which contains information related to energizing heater elements 138 and the time such control will be exercised, is provided to digital-to-analog converter 132, where an analog signal is outputted to control solid state relay 134. Solid state relay 134 is connected to power signal 136 and connects power signal 136 with heater element 138 as a function of the analog signal from converter 132. The basic components of the control system depicted in FIG. 6 are generally well known in the prior art.

Figure 7:
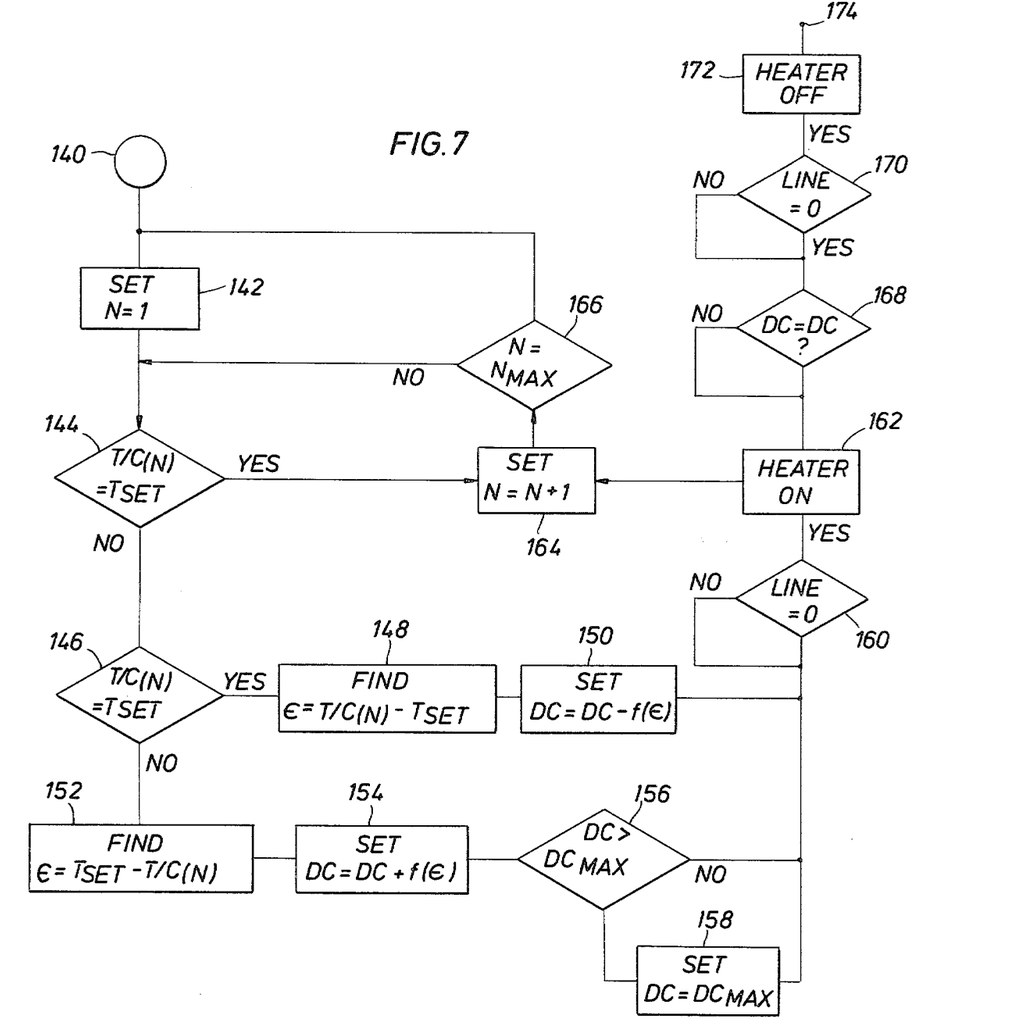
FIG. 7 is a temperature control flow diagram.

Referring now to FIG. 7, there is depicted a computing flow diagram suitable for deriving a control signal for application to solid state relay 134 (see FIG. 6). Once the system is initialized 140, a closed loop operation is carried out where each of the thermocouples is interrogated in turn and a corresponding duty cycle computed for the heater elements associated with that thermocouple. Since the system heat capacities provide relatively slow response, a real time operation may be carried out.

A first thermocouple is selected 142 and the thermocouple output reading is compared 144 with its set point value. If the thermocouple output is equal to the set point value, then the thermocouple selection is incremented 164. It is then determined 166 whether the last thermocouple has been interrogated. If so, the system is reset 142 to interrogate the first thermocouple again. If not, the next thermocouple output is compared 144 with its set point.

If the thermocouple output does not equal the set point value, a comparison 146 is made to determine whether the thermocouple output is greater or less than the set point. Where the thermocouple output is greater than the set point, an error signal is generated 148 which is related to the magnitude of the difference between the thermocouple output and the set point. A duty cycle is selected 150 which is reduced from the previous duty cycle by a factor which is related to the magnitude of the difference determined at 148. This provides a proportional-type control system which can minimize or eliminate system overshoot about the set point.

Where the thermocouple output is less than the temperature set point, an error signal is derived 152 which is the magnitude of the different between the set point and the thermocouple output signal. The duty cycle is now adjusted 154 upward by increasing the previous duty cycle an amount related to the error signal computed at 152. In this instance, it is desired to maintain the maximum duty cycle below a preselected maximum in order to reduce power surges and also to maintain the rate of heat input to the substrate at acceptable levels. Thus, the derived duty cycle is compared 156 with the selected maximum duty cycle. If the duty cycle is below the acceptable maximum, then the computed duty cycle is used. If the computed duty cycle is greater than the preselected maximum signal, then the duty cycle is set 158 at the selected maximum duty cycle.

Once the operating routine has determined the duty cycle to be used in activating the heater elements, it may be desirable to monitor the line signal and switch the elements on or off as the line signal passes through a zero value. Thus, as shown in FIG. 7, the routine monitors line voltage to determine if the line is zero 160. When that condition occurs, the heater element is turned on 162. When the heater element is turned on, the main operating routine returns to increment 164 the thermocouple selection and repeat the determination.

In a sub-routine, the heater-on time is monitored 168 until the duty cycle is reached, whereupon the line condition is again monitored 170 and the heater turned off 172 when a zero line condition occurs. The sub-routine completes 174 and awaits another duty cycle command to activate a heater.

It should be recognized that a variety of control schemes may be used to activate the heaters in a manner effective to maintain the overlying glass substrate at a preselected temperature. This control scheme is not part of the present invention, but is presented herein to complete the description of the system operation.

Thus, an improved heated conveyor system is provided wherein sheets of substrate may be heated, subjected to a film-forming spray deposition, and cooled to room temperature on a continuous basis. A conveyor system is provided wherein the substrate materials may be heated by radiative heaters below the substrate while a spray system is depositing film-forming materials above the substrate. The conveyor is designed to maintain only minimum gaps between the substrate and surrounding conveyor supports so that airflow effects will not significantly effect film-forming operations on the substrate surface.

Further, accurate temperature control is maintained by illuminating surfaces of the substrate only through heater groups which irradiate immediately adjacent portions of the substrate so that feedback does not occur between adjacent control heater groups. A temperature control scheme is provided for calibrating the thermocouples relative to the temperature of the glass substrate and for activating the heaters on a duty cycle control, where uniform heating of the substrate occurs.

It is apparent that the present invention is one well adapted to attain all of the objects and advantages which will become obvious and inherent from a description of the apparatus itself. It will also be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A heated conveyor, comprising:
   a conveyor belt assembly for supporting a transparent vitreous substrate in a manner effective to obtain uniform heating of said substrate through said conveyor belt;
   a plurality of radiative heaters interconnected to form a plurality of heater control groups, and
   radiation shields placed between adjacent heater control groups and extending from the elevation of said heaters to an elevation adjacent said conveyor belt assembly effective to substantially confine radiant heating from said control group to a facing area of said vitreous substrate.

2. A heated conveyor according to claim 1, further including:
   at least one control thermocouple affixed to a radiative heater in a control group for providing output signals functionally related to a temperature of said substrate; and
   calibration thermocouple means extending to an elevation between said control thermocouple and said conveyor and producing an output signal for deriving said functional relationship between said control thermocouple signal and said substrate temperature.

3. A heated conveyor according to claim 2, wherein said conveyor belt assembly further includes:
   wire mesh for supporting said substrate, and
   support means for maintaining said wire mesh within a selected range of elevations above said radiative heaters.

4. A heated conveyor according to claim 3, wherein said support means includes:
   substantially rigid supports extending across said wire mesh and supporting said mesh at locations effective for accepting preselected lengths of said substrate,
   said wire mesh contacting said substrate along leading and trailing edge portions within a preselected range of elevations above said heaters.

5. A heated conveyor according to claim 4 further including:
   continuous conveying means attached to said rigid supports for moving said wire mesh along said heaters.

6. A heated conveyor according to claim 4, further including:
   spacer strips attached to said rigid supports for substantially filling the space between a trailing edge of one substrate and a leading edge of a following substrate.

7. A heated conveyor according to claim 5, wherein said continuous conveying means further includes:
   means for equalizing the travel distance of said rigid supports and said wire mesh to maintain said rigid supports in substantially parallel alignment.

8. A heated conveyor according to claim 4, further including:
   at least one end drum for reversing the direction of said wire mesh, and
   shim means on said end drum effective to substantially equalize the effective radius of travel for said rigid supports and said wire mesh around said end drum.

9. A heated conveyor according to claim 6, further including:
   travel equalizing means for maintaining said spacer strips substantially parallel with adjacent facing substrate edges.

10. A heated conveyor according to claim 9, wherein said travel equalizing means includes:
   at least one end drum for reversing the direction of said wire mesh, and
   shim means on said end drum effective to substantially equalize the effective radius of travel for said rigid supports and said wire mesh around said end drum.

11. A heated conveyor according to claim 1 or 3, wherein:
   said radiative heaters extend beyond side portions of said substrate a distance effective to maintain an included heater angle illuminating any point along said substrate wherein a substantially uniform energy flux density is produced across said substrate.

12. As a sub-assembly, a conveyor belt assembly comprising:
   a wire mesh belt for engaging a substrate to be conveyed,
   substantially rigid supports extending across said mesh belt and supporting said belt at intervals selected to accept a preselected substrate length between adjacent supports,
   said mesh belt being adapted to contact said substrate substantially along only leading and trailing edge portions of said substrate adjacent said rigid supports,
   at least one end drum for rotating said mesh belt, and
   means for equalizing travel distance of said belt and said rigid supports around said end drum.

13. A sub-assembly according to claim 12, further including:
   a pair of drive chains connecting said rigid supports, and
   sprocket means engaging at least one of said chains for rotating said conveyor belt assembly.

14. A sub-assembly according to claim 12 or 13, including:
   shim means on said end drum for equalizing the effective radius of said mesh belt and said rigid supports during movement around said end drum.

15. A process for uniformly heating transparent vitreous substrates on a continuous conveyor, comprising the steps of:
   conveying said substrates along a plurality of radiative heaters,
   energizing said radiative heaters in controlled groups, and
   illuminating a point on a surface of said substrate with said radiative heaters in a first controlled heater group during a first time interval, and
   shielding said point on said surface of said substrate from radiative heat from other of said controlled heater groups during said first time interval.

16. A process according to claim 15, further including the step of:
   detecting the temperature of a radiative heater within each one of said control groups;
   energizing said heaters responsive to said detected temperature; and
   deriving a calibration function relating said temperature of said radiative heater to a corresponding temperature of said substrate.

17. A process according to claim 15, wherein conveying said substrate further includes the steps of:
   supporting each of said substrates on said conveyor substantially along leading and trailing edge portions of said substrates; and
   illuminating said substrate through said conveyor.

18. A process according to claim 17, wherein supporting said substrates further includes the steps of:
   contacting said leading and trailing edge portions of said substrates with mesh belt portions of said conveyor; and
   supporting said mesh belt with support bars at intervals spaced apart a distance greater than the length of said substrates.

19. A process according to claim 18, further including the step of:
   rotating said mesh belt portion and said support bars about end portions of said conveyor in a manner effective to maintain said support bars substantially parallel with adjacent facing edge portions of said substrates when conveying said substrates along said plurality of heaters.

20. As a sub-assembly, a system for driving an output signal functionally related to surface temperature of a sheet of substrate material being heated by radiative heaters, comprising:
   a first thermocouple affixed to said radiative heaters, and
   a second thermocouple insertable to a preselected location intermediate of said first thermocouple and said substrate.

21. A sub-assembly according to claim 20, wherein said first thermocouple is welded to one said radiative heaters.

22. A sub-assembly according to claim 20, wherein said output signal is provided by said first thermocouple.

23. A sub-assembly according to claim 22, said second thermocouple providing a second signal for deriving said functional relationship between said output signal of said first thermocouple and said surface temperature.

24. As a sub-assembly, a conveyor belt assembly comprising:
   a wire mesh belt for engaging a substrate to be conveyed;
   substantially rigid supports extending across said mesh belt and supporting said belt at intervals selected to accept a preselected substrate length between adjacent supports;
   said mesh belt contacting said substrate along leading and trailing edge portions of said substrate adjacent said rigid supports; and
   spacer strips attached to said rigid supports for substantially filling the space between a trailing edge of one substrate and a leading edge of a following substrate.

25. A sub-assembly according to claim 24, further including:
   continuous conveying means attached to said rigid supports for moving said wire mesh belt.

26. A sub-assembly according to claim 24, wherein said spacer strips maintain a gap of approximately 0.125 inch between an edge of a spacer strip and a facing edge of an adjacent substrate.

* * * * *